(12) United States Patent
Kadono

(10) Patent No.: US 12,516,500 B2
(45) Date of Patent: Jan. 6, 2026

(54) METHOD AND SYSTEM FOR CONTROLLING WORK MACHINE, AND WORK MACHINE

(71) Applicant: KOMATSU LTD., Tokyo (JP)

(72) Inventor: Yuuichi Kadono, Tokyo (JP)

(73) Assignee: KOMATSU LTD., Tokyo (JP)

( * ) Notice: Subject to any disclaimer, the term of this patent is extended or adjusted under 35 U.S.C. 154(b) by 214 days.

(21) Appl. No.: 18/040,279

(22) PCT Filed: Aug. 6, 2021

(86) PCT No.: PCT/JP2021/029346
§ 371 (c)(1),
(2) Date: Feb. 2, 2023

(87) PCT Pub. No.: WO2022/085272
PCT Pub. Date: Apr. 28, 2022

(65) Prior Publication Data
US 2023/0279639 A1 Sep. 7, 2023

(30) Foreign Application Priority Data
Oct. 21, 2020 (JP) ................. 2020-176499

(51) Int. Cl.
*E02F 9/20* (2006.01)
*E02F 9/22* (2006.01)
(Continued)

(52) U.S. Cl.
CPC ............ *E02F 9/2045* (2013.01); *E02F 9/262* (2013.01); *G05D 1/0274* (2013.01); *G05D 1/0291* (2013.01); *E02F 9/2228* (2013.01)

(58) Field of Classification Search
CPC ....... E02F 9/2045; E02F 9/262; E02F 9/2228; E02F 3/841; E02F 9/205; G05D 1/0274; G05D 1/0291
See application file for complete search history.

(56) References Cited

U.S. PATENT DOCUMENTS

| 6,502,016 B1 | 12/2002 | Ozaki et al. |
| 9,298,188 B2 | 3/2016 | Kini et al. |
| (Continued) | | |

FOREIGN PATENT DOCUMENTS

| JP | 2000-137522 A | 5/2000 |
| JP | 2007-164279 A | 6/2007 |
| JP | 2019-178972 A | 10/2019 |

OTHER PUBLICATIONS

Melenbrink, Nathan, et al. (On-site autonomous construction robots: Towards unsupervised building); Automation in Construction, Jun. 29, 2020 (Year: 2020).*
(Continued)

*Primary Examiner* — Kyle J Kingsland
(74) *Attorney, Agent, or Firm* — GLOBAL IP COUNSELORS, LLP

(57) ABSTRACT

A first process acquires a boundary position between a work area and a dumping area. A second process acquires a current position of a work machine. A third process controls the work machine so as to form a berm that acts as a wheel stop by raising a work implement from a position, the position being away from the boundary position toward the work area by a predetermined distance, when the work machine is traveling from the work area toward the dumping area.

17 Claims, 13 Drawing Sheets

(51) Int. Cl.
    *E02F 9/26*           (2006.01)
    *G05D 1/00*          (2024.01)

(56) References Cited

U.S. PATENT DOCUMENTS

| | | |
|---|---|---|
| 2007/0150133 A1 | 6/2007 | Sudou et al. |
| 2014/0214236 A1 | 7/2014 | Kini et al. |
| 2014/0371947 A1* | 12/2014 | Stratton .................. G01C 7/04 |
| | | 701/1 |
| 2016/0076224 A1 | 3/2016 | Edara et al. |
| 2023/0278574 A1* | 9/2023 | Buda .................. G01C 21/3807 |
| | | 701/301 |

OTHER PUBLICATIONS

Examination report No. 1 for the corresponding Australian application No. 2021365921, issued on Mar. 13, 2024.
MSHA Handbook Series, 'Dump-Point Inspection Handbook' Handbook No. PH01-1-6, U. S. Department of Labor, Sep. 2001.
The International Search Report for the corresponding international application No. PCT/JP2021/029346, issued on Oct. 26, 2021.
The Office Action for the corresponding Canadian application No. 3,189,934 issued on Jun. 6, 2024.

* cited by examiner ically performed under automatic control of the work machine. An object of the present disclosure is to form a berm that acts as wheel stop under automatic control of a work machine.
METHOD AND SYSTEM FOR CONTROLLING WORK MACHINE, AND WORK MACHINE

CROSS-REFERENCE TO RELATED APPLICATIONS

This application is a U.S. National stage application of International Application No. PCT/JP2021/029346, filed on Aug. 6, 2021. This U.S. National stage application claims priority under 35 U.S.C. §119(a) to Japanese Patent Application No. 2020-176499, filed in Japan on Oct. 21, 2020, the entire contents of which are hereby incorporated herein by reference.

TECHNICAL FIELD

The present disclosure relates to a method and a system for controlling a work machine, and a work machine.

Background Information

A transport vehicle, such as a dump truck, transports material, such as soil and the like, to a dumping area and discharges the material to the dumping area. The dumping area is located below a cliff, and as disclosed in U.S. Pat. No. 9,298,188, for example, a berm that acts as wheel stop is disposed in front of the dumping area.

SUMMARY

The berm described above is formed by a work machine, such as a bulldozer transporting soil. Because work of forming the berm is performed in a vicinity of the dumping area, it is preferably performed under automatic control of the work machine. An object of the present disclosure is to form a berm that acts as wheel stop under automatic control of a work machine.

A method according to a first aspect of the present disclosure is a method for controlling a work machine including a work implement. The method according to the present aspect includes the following processes. A first process acquires a boundary position between a work area and a dumping area. A second process acquires a current position of the work machine. A third process controls the work machine so as to form a berm that acts as wheel stop by raising the work implement from a position, the position being away from the boundary position toward the work area by a predetermined distance, when the work machine is traveling from the work area toward the dumping area. The execution order of the processes is not limited to the order described above and may be changed.

A system according to a second aspect of the present disclosure is a system for controlling a work machine including a work implement. The system according to the present aspect includes a sensor and a controller. The sensor detects a current position of the work machine. The controller acquires a boundary position between a work area and a dumping area. The controller acquires the current position of the work machine. The controller controls the work machine so as to form a berm that acts as wheel stop by raising the work implement from a position, the position being away from the boundary position toward the work area by a predetermined distance, when the work machine is traveling from the work area toward the dumping area.

A work machine according to a third aspect of the present disclosure includes a work implement, a sensor, and a controller. The sensor detects a current position of the work machine. The controller acquires a boundary position between a work area and a dumping area. The controller acquires the current position of the work machine. The controller controls the work machine so as to form a berm that acts as wheel stop by raising the work implement from a position, the position being away from the boundary position toward the work area by a predetermined distance, when the work machine is traveling from the work area toward the dumping area.

According to the present disclosure, it is possible to form a berm that acts as wheel stop under automatic control of a work machine.

DESCRIPTION OF EMBODIMENTS

Figure 1:
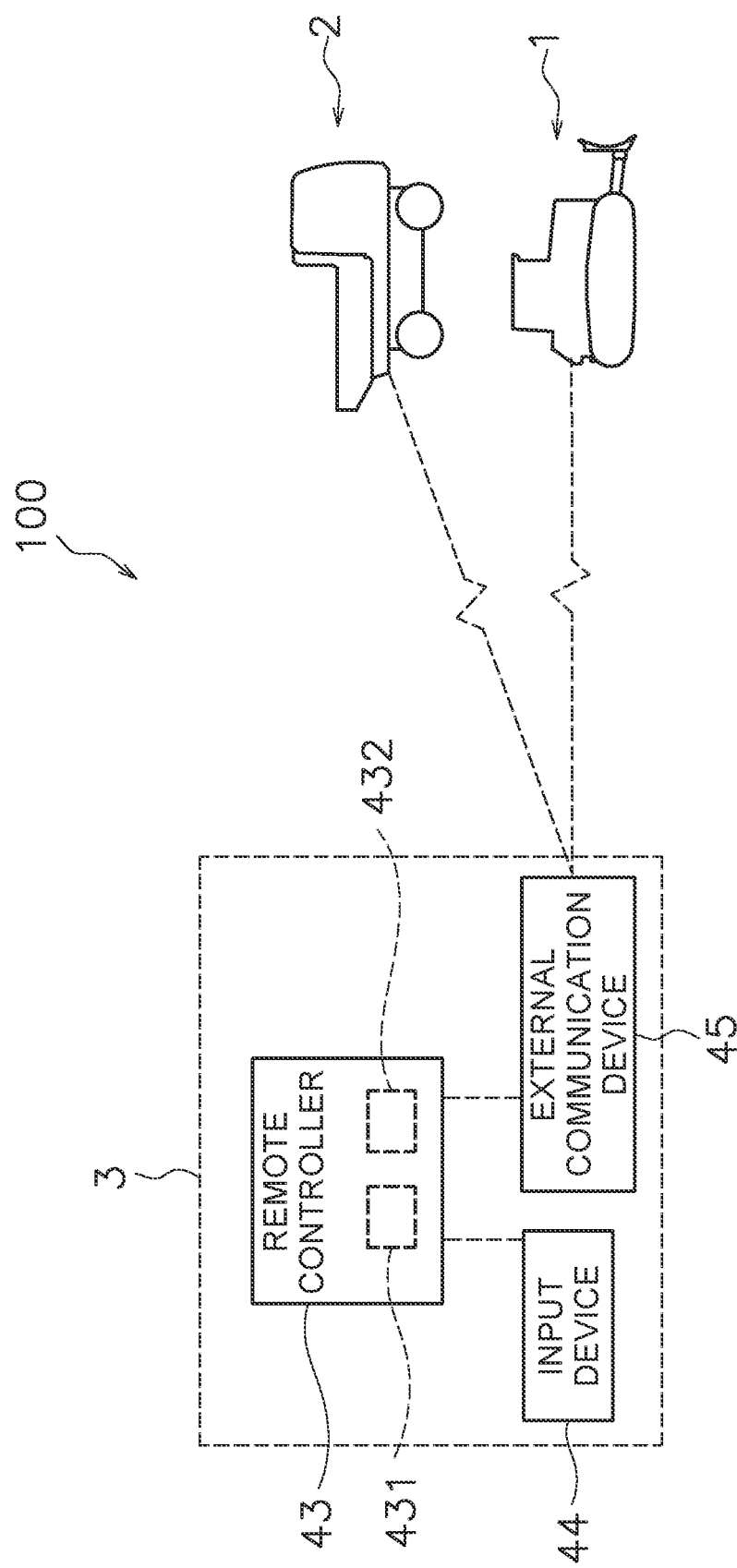
FIG. 1 is a schematic diagram illustrating a control system of a work machine according to an embodiment.

A system 100 according to an embodiment will be described below with reference to the drawings. FIG. 1 is a schematic diagram illustrating the system 100 according to the embodiment. The system 100 includes a work machine 1, a transport vehicle 2, and a remote control system 3. The system 100 controls the work machine 1 and the transport vehicle 2 disposed at a work site, such as a mine or the like. The work machine 1 is, for example, a bulldozer. The transport vehicle 2 is, for example, a dump truck. The number of the work machines 1 is not limited to one and may be greater than one. The number of the transport vehicles 2 is not limited to one and may be greater than one.

Figure 2:
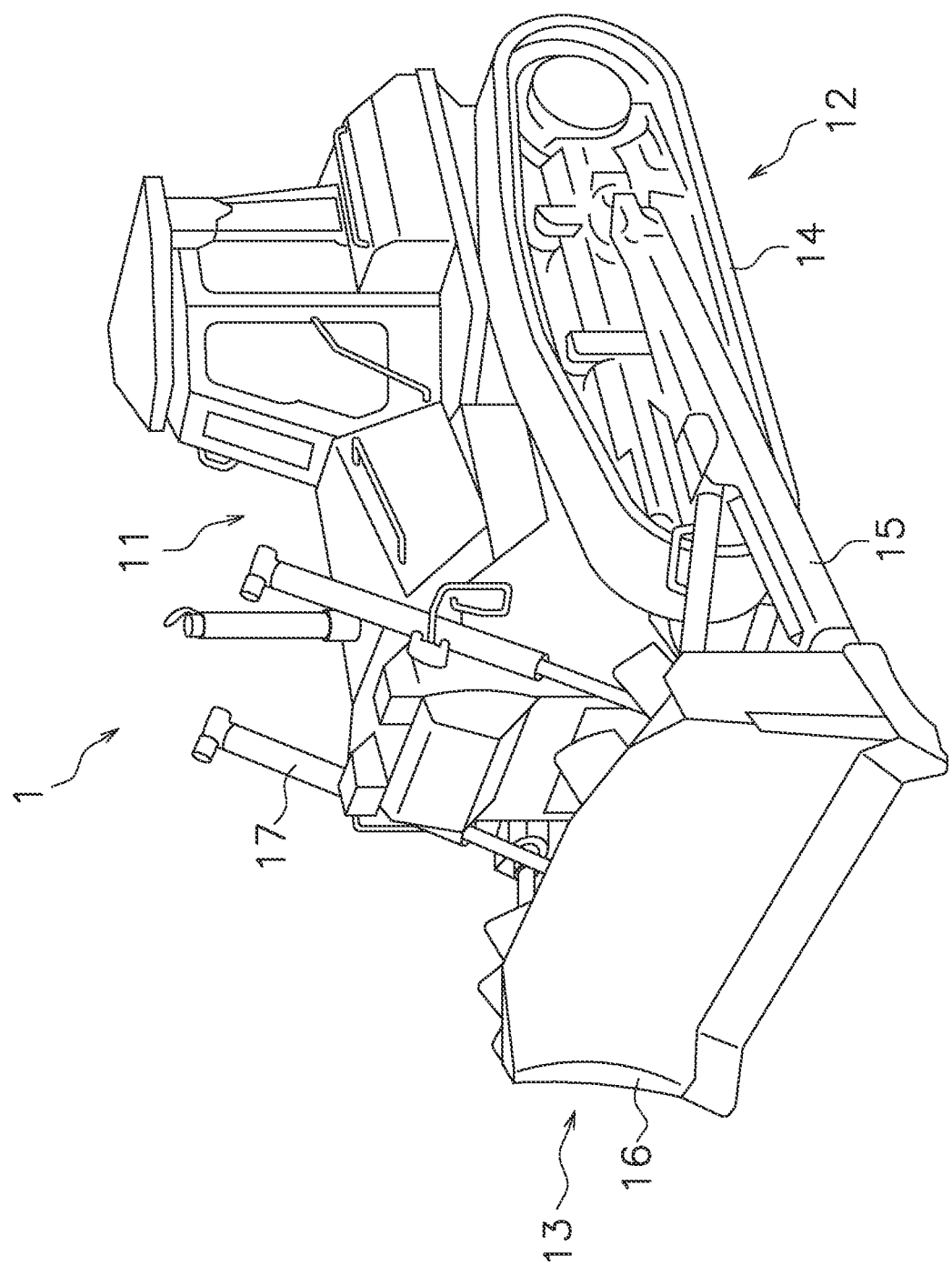
FIG. 2 is a perspective view of the work machine.
Figure 3:
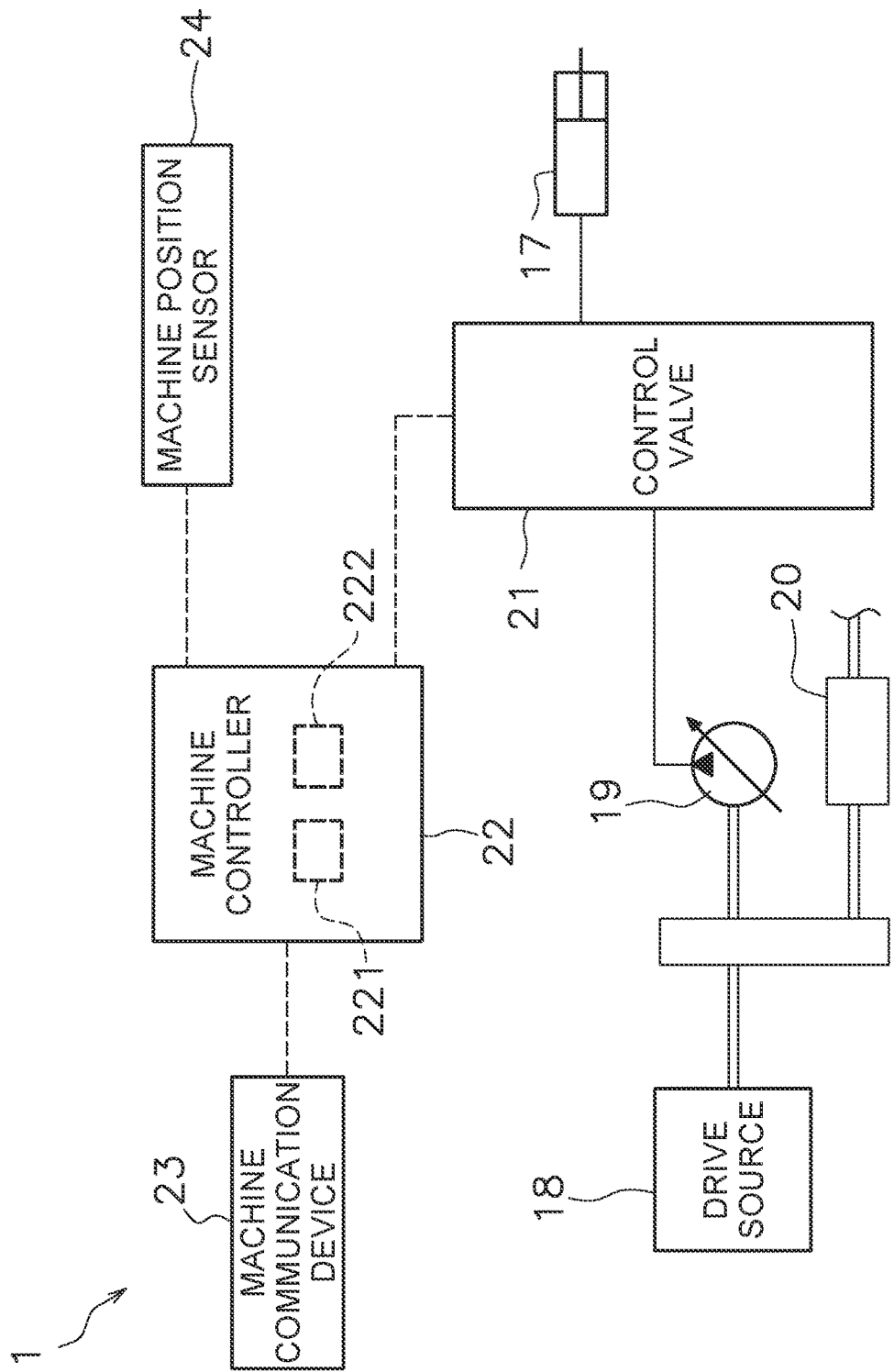
FIG. 3 is a block diagram illustrating a configuration of the work machine.

FIG. 2 is a perspective view of the work machine 1. FIG. 3 is a block diagram illustrating a configuration of the work machine 1. As illustrated in FIG. 2, the work machine 1 includes a vehicle body 11, a travel device 12, and a work implement 13. The vehicle body 11 is supported by the travel device 12. The travel device 12 includes a crawler belt 14. The work machine 1 travels due to the rotation of the crawler belt 14.

The work implement 13 is attached to the vehicle body 11. The work implement 13 includes a lift frame 15, a blade 16, and a lift cylinder 17. The lift frame 15 is attached to the travel device 12 so as to be movable up and down. The lift frame 15 may be attached to the vehicle body 11. The lift frame 15 supports the blade 16. The blade 16 moves up and down accompanying the up and down movements of the lift frame 15. The lift cylinder 17 is coupled to the vehicle body 11 and the lift frame 15. Due to the extension and contraction of the lift cylinder 17, the lift frame 15 moves up and down.

As illustrated in FIG. 3, the work machine 1 includes a drive source 18, a hydraulic pump 19, a power transmission device 20, and a control valve 21. The drive source 18 is, for example, an internal combustion engine. The hydraulic pump 19 is driven by the drive source 18 to discharge hydraulic fluid. The hydraulic fluid discharged from the hydraulic pump 19 is supplied to the lift cylinder 17. Although one hydraulic pump is illustrated in FIG. 3, a plurality of hydraulic pumps may be provided.

The power transmission device 20 transmits the driving force of the drive source 18 to the travel device 12. The power transmission device 20 may be, for example, a hydro static transmission (HST). Alternatively, the power transmission device 20 may be a transmission having a torque converter or a plurality of transmission gears. Alternatively, the power transmission device 20 may be another type of transmission.

The control valve 21 is disposed between a hydraulic actuator, such as the lift cylinder 17, and the hydraulic pump 19. The control valve 21 controls the flow rate of hydraulic fluid supplied from the hydraulic pump 19 to the lift cylinder 17. The control valve 21 may be a pressure proportional control valve. Alternatively, the control valve 21 may be an electromagnetic proportional control valve.

The work machine 1 includes a machine controller 22 and a machine communication device 23. The machine controller 22 controls the travel device 12 or the power transmission device 20, thereby causing the work machine 1 to travel. The machine controller 22 controls the control valve 21, thereby causing the blade 16 to move up and down.

The machine controller 22 is programmed to control the work machine 1 based on acquired data. The machine controller 22 includes a processor 221 and a storage device 222. The processor 221 is, for example, a central processing unit (CPU). Alternatively, the processor 221 may be a processor that is different from the CPU. The processor 221 executes processes for controlling the work machine 1 according to programs.

The storage device 222 includes a non-volatile memory, such as a ROM, and a volatile memory, such as a RAM. The storage device 222 may include an auxiliary storage device, such as a hard disk, a solid state drive (SSD), or the like. The storage device 222 is an example of a non-transitory computer-readable recording medium. The storage device 222 stores computer commands and data for controlling the work machine 1.

The machine communication device 23 wirelessly communicates with the remote control system 3. For example, the machine communication device 23 communicates with the remote control system 3 via a wireless LAN, such as Wi-Fi (registered trademark), a mobile communication such as 3G, 4G, or 5G, or another type of wireless communication network.

The work machine 1 includes a machine position sensor 24. The machine position sensor 24 may include, for example, a global navigation satellite system (GNSS) receiver, such as a global positioning system (GPS). Alternatively, the machine position sensor 24 may include a receiver for another positioning system. The machine position sensor 24 may include a ranging sensor, such as Lidar, or an image sensor, such as a stereo camera. The machine position sensor 24 outputs position data to the machine controller 22. The position data indicates a current position of the work machine 1.

Figure 4:
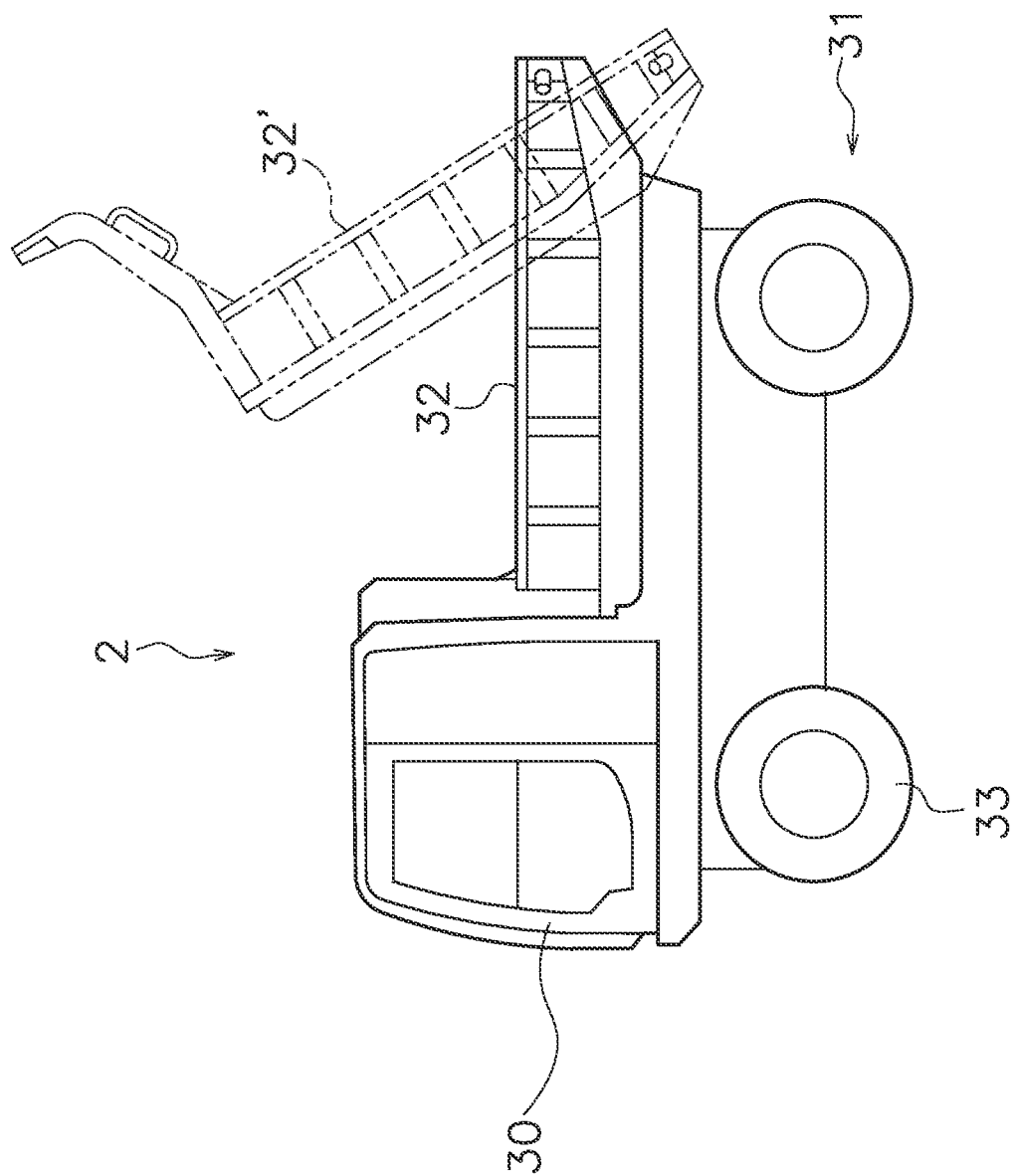
FIG. 4 is a side view of a transport vehicle.
Figure 5:
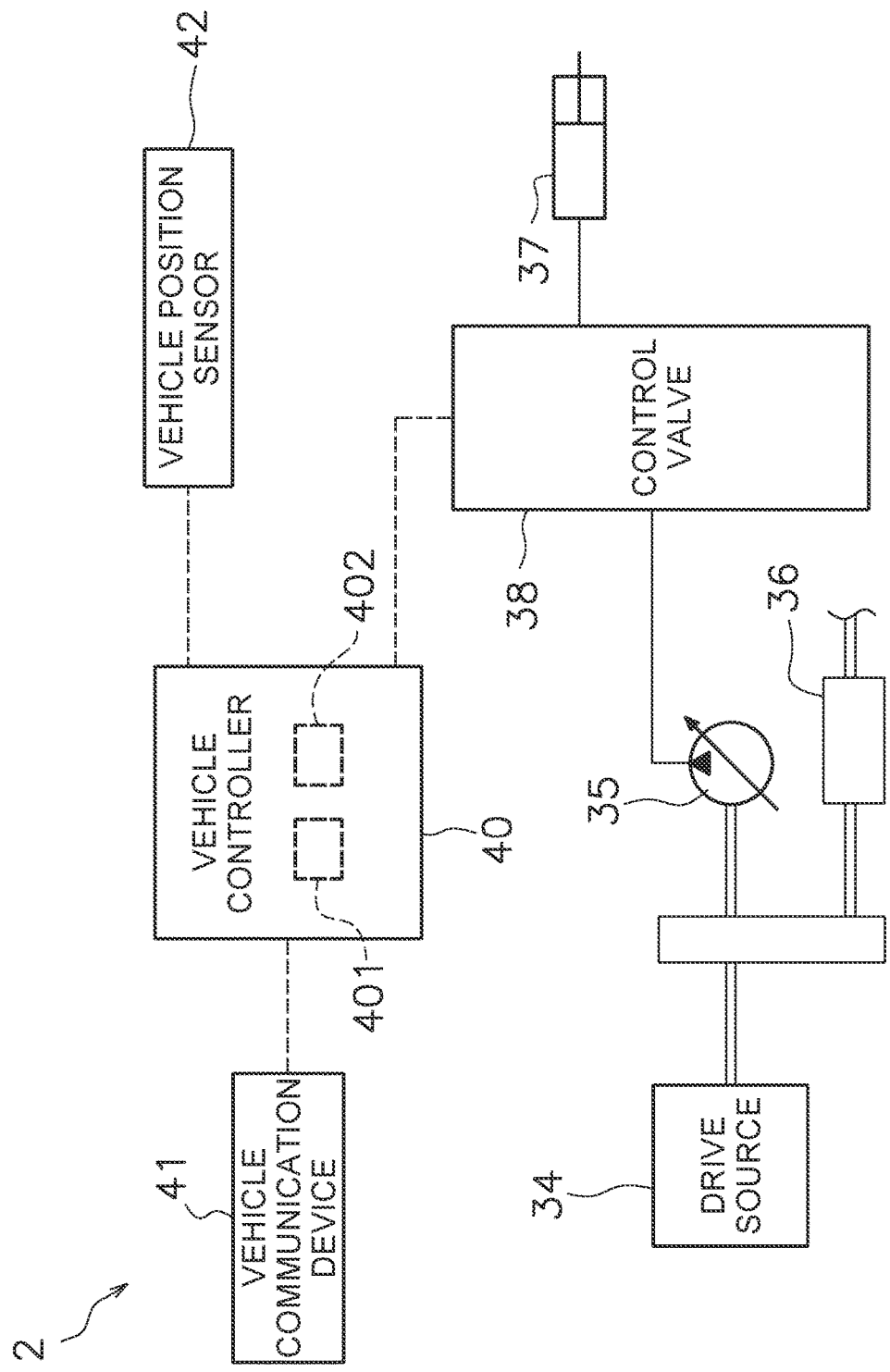
FIG. 5 is a block diagram illustrating a configuration of the transport vehicle.

FIG. 4 is a side view of the transport vehicle 2. FIG. 5 is a block diagram illustrating a configuration of the transport vehicle 2. As illustrated in FIG. 4, the transport vehicle 2 includes a vehicle body 30, a travel device 31, and a bed 32. The vehicle body 30 is supported by the travel device 31. The travel device 31 includes tires 33. The tires 33 are driven, whereby the transport vehicle 2 travels.

The bed 32 is supported by the vehicle body 30. The bed 32 is configured to move between a dumping posture and a transporting posture. In FIG. 4, the bed 32 indicated by the solid lines represents a position of the bed 32 in the transporting posture. A bed 32' indicated by the chain double-dashed lines represents a position of the bed 32 in the dumping posture. In the transporting posture, the bed 32 is disposed approximately horizontally. In the dumping posture, the bed 32 is tilted with respect to the transporting posture.

As illustrated in FIG. 5, the transport vehicle 2 includes a drive source 34, a hydraulic pump 35, a power transmission device 36, a lift cylinder 37, and a control valve 38. The drive source 34 is, for example, an internal combustion engine. The hydraulic pump 35 is driven by the drive source 34 to discharge hydraulic fluid. Although one hydraulic pump is illustrated in FIG. 5, a plurality of hydraulic pumps may be provided. The control valve 38 is disposed between the lift cylinder 37 and the hydraulic pump 35. The control valve 38 controls the flow rate of hydraulic fluid supplied from the hydraulic pump 35 to the lift cylinder 37. The control valve 38 may be a pressure proportional control valve. Alternatively, the control valve 38 may be an electromagnetic proportional control valve.

The power transmission device 36 transmits the driving force of the drive source 34 to the travel device 31. The power transmission device 36 is, for example, a hydro static transmission (HST). The lift cylinder 37 is a hydraulic cylinder. The hydraulic fluid discharged from the hydraulic pump 35 is supplied to the lift cylinder 37. The lift cylinder 37 is driven by the hydraulic fluid from the hydraulic pump 35. The lift cylinder 37 raises and lowers the bed 32. Accordingly, the posture of the bed 32 is switched between the transporting posture and the dumping posture.

The transport vehicle 2 includes a vehicle controller 40 and a vehicle communication device 41. The vehicle controller 40 controls the travel device 31 or the power transmission device 36, thereby causing the transport vehicle 2 to travel. The vehicle controller 40 controls the control valve 38, thereby causing the bed 32 to switch between the transporting posture and the dumping posture.

The vehicle controller 40 is programmed to control the transport vehicle 2 based on acquired data. The vehicle controller 40 includes a processor 401 and a storage device 402. The processor 401 is, for example, a central processing unit (CPU). Alternatively, the processor 401 may be a processor that is different from the CPU. The processor 401 executes processes for controlling the transport vehicle 2 according to programs.

The storage device 402 includes a non-volatile memory, such as a ROM, and a volatile memory, such as a RAM. The storage device 402 may include an auxiliary storage device, such as a hard disk, a solid state drive (SSD), or the like. The storage device 402 is an example of a non-transitory computer-readable recording medium. The storage device 402 stores computer commands and data for controlling the transport vehicle 2.

The vehicle communication device 41 wirelessly communicates with the remote control system 3. For example, the vehicle communication device 41 communicates with the remote control system 3 via a wireless LAN, such as Wi-Fi (registered trademark), a mobile communication such as 3G, 4G, or 5G, or another type of wireless communication network.

The transport vehicle 2 includes a vehicle position sensor 42. The vehicle position sensor 42 may include, for example, a global navigation satellite system (GNSS) receiver, such as a global positioning system (GPS). Alternatively, the vehicle position sensor 42 may include a receiver for another positioning system. The vehicle position sensor 42 may include a ranging sensor, such as Lidar, or an image sensor, such as a stereo camera. The vehicle position sensor 42 outputs position data to the vehicle controller 40. The position data indicates a current position of the transport vehicle 2.

The remote control system 3 is disposed, for example, in a management center remote from the work site. Alternatively, the remote control system 3 may be disposed in the work site. The remote control system 3 remotely controls the work machine 1 and the transport vehicle 2. As illustrated in FIG. 1, the remote control system 3 includes a remote controller 43, an input device 44, and an external communication device 45.

The external communication device 45 wirelessly communicates with the machine communication device 23 and the vehicle communication device 41. The external communication device 45 transmits command signals from the remote controller 43 to the machine communication device 23 and the vehicle communication device 41. The machine controller 22 receives the command signals via the machine communication device 23. The vehicle controller 40 receives the command signals via the vehicle communication device 41. The external communication device 45 receives the position data of the work machine 1 via the machine communication device 23. The external communication device 45 receives the position data of the transport vehicle 2 via the vehicle communication device 41.

The input device 44 is a device that is operable by an operator. The input device 44 receives an input command from the operator and outputs an operation signal corresponding to the input command to the remote controller 43. The input device 44 outputs the operation signal according to an operation by the operator. The input device 44 outputs the operation signal to the remote controller 43. The input device 44 may include a pointing device, such as a mouse, a trackball, or the like. The input device 44 may include a keyboard. The input device 44 may include a touch screen.

The remote controller 43 receives the operation signal from the input device 44. The remote controller 43 acquires the position data of the work machine 1 from the work machine 1. The remote controller 43 acquires the position data of the transport vehicle 2 from the transport vehicle 2. The remote controller 43 includes a processor 431 and a storage device 432. The processor 431 is, for example, a central processing unit (CPU). Alternatively, the processor 431 may be a processor that is different from the CPU. The processor 431 executes processes for controlling the work machine 1 and the transport vehicle 2 according to programs.

The storage device 432 includes a non-volatile memory, such as a ROM, and a volatile memory, such as a RAM. The storage device 432 may include an auxiliary storage device, such as a hard disk, a solid state drive (SSD), or the like. The storage device 432 is an example of a non-transitory computer-readable recording medium. The storage device 432 stores computer commands and data for controlling the work machine 1 and the transport vehicle 2.

Figure 6:
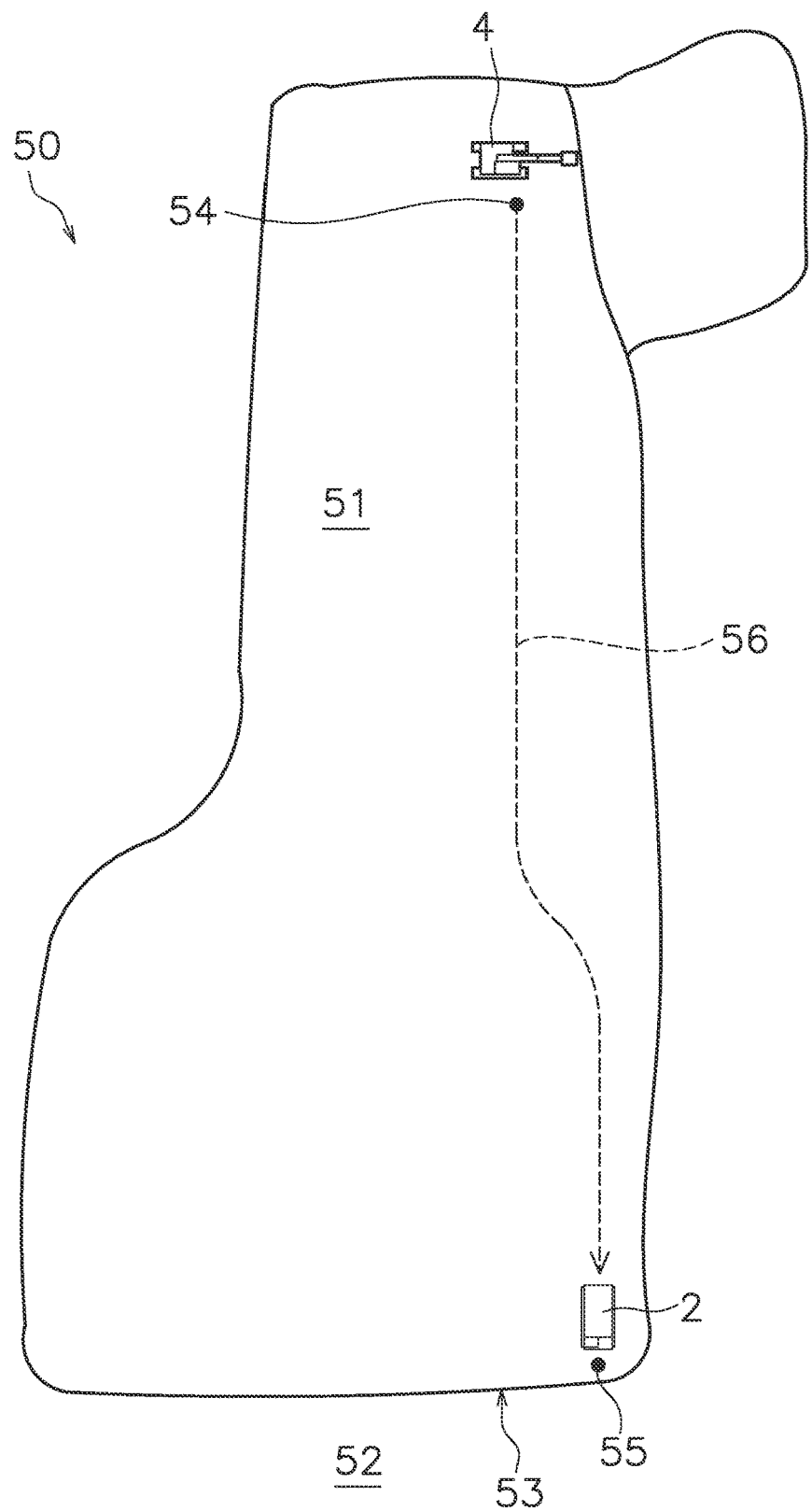
FIG. 6 is a top view of a work site.

Next, automatic operation of the work machine 1 and the transport vehicle 2 performed by the system 100 will be described. FIG. 6 is a top view of the work site. The remote controller 43 stores actual topography data indicative of an actual topography 50 of the work site. The actual topography 50 includes a work area 51 and a dumping area 52. A digging machine 4 is disposed in the work area 51. The digging machine 4 performs digging in the work area 51. The digging machine 4 may be automatically controlled by the remote controller 43. Alternatively, the digging machine 4 may be manually operated.

The remote controller 43 stores a position of the work area 51 and a position of the dumping area 52. The remote controller 43 acquires a boundary position 53 between the work area 51 and the dumping area 52 from the actual topography data. The remote controller 43 determines a loading position 54 and a dumping position 55. The loading position 54 is a position in a vicinity of the digging machine 4. The dumping position 55 is a position in a vicinity of the boundary position 53. The loading position 54 and the dumping position 55 may be set by the operator operating the input device 44. The remote controller 43 determines a travel route 56 that connects the loading position 54 and the dumping position 55. The remote controller 43 determines the travel route 56 so that a travel distance of the transport vehicle 2 is minimized, for example.

The remote controller 43 controls the transport vehicle 2 so that the transport vehicle 2 moves to the loading position 54. The dug soil is loaded onto the transport vehicle 2 at the loading position 54. The remote controller 43 controls the transport vehicle 2 so that the transport vehicle 2 moves along the travel route 56. The remote controller 43 controls the transport vehicle 2 so that the transport vehicle 2 discharges the soil from the bed 32 at the dumping position 55. The remote controller 43 determines a next loading position 54 and a next dumping position 55 and controls the transport vehicle 2 so that the transport vehicle 2 moves to the next loading position 54. By repeating the above processes, the soil dug by the digging machine 4 is transported from the work area 51 to the dumping area 52.

Figure 7:
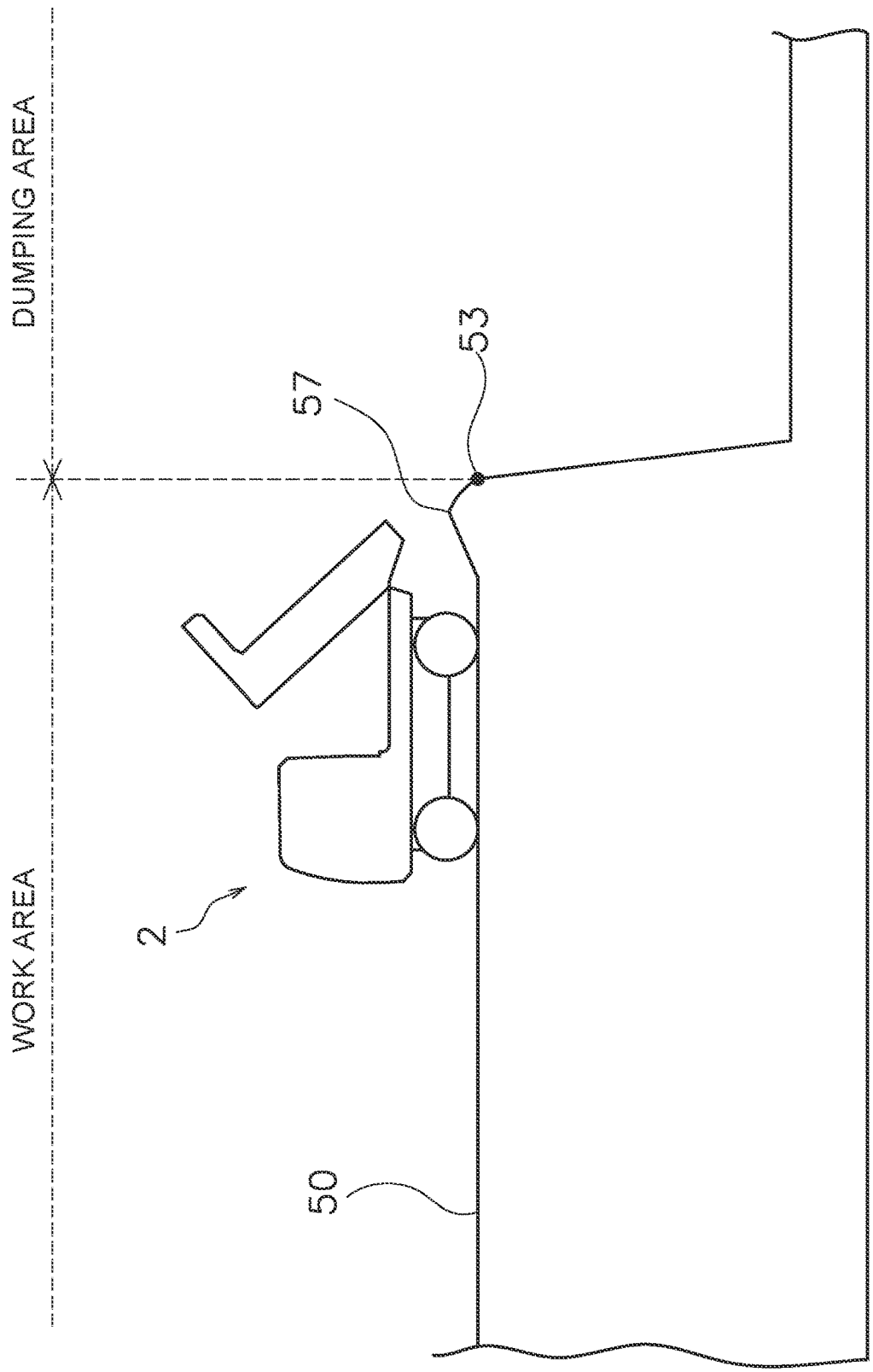
FIG. 7 is a vertical cross-sectional view illustrating an actual topography in a vicinity of a boundary position.

FIG. 7 is a vertical cross-sectional view illustrating the actual topography 50 in a vicinity of the boundary position 53 between the work area 51 and the dumping area 52. As illustrated in FIG. 7, a berm that acts as wheel stop 57 is disposed at the boundary position 53. The berm 57 has a raised shape from the actual topography 50. The height of the berm 57 is lower than a position of the bed 32 of the transport vehicle 2. The berm 57 is disposed at the boundary position 53 so that the transport vehicle 2 does not go beyond the boundary position 53 toward the dumping area 52. Automatic control of the work machine 1 in order to form the berm 57 will be described below.

Figure 8:
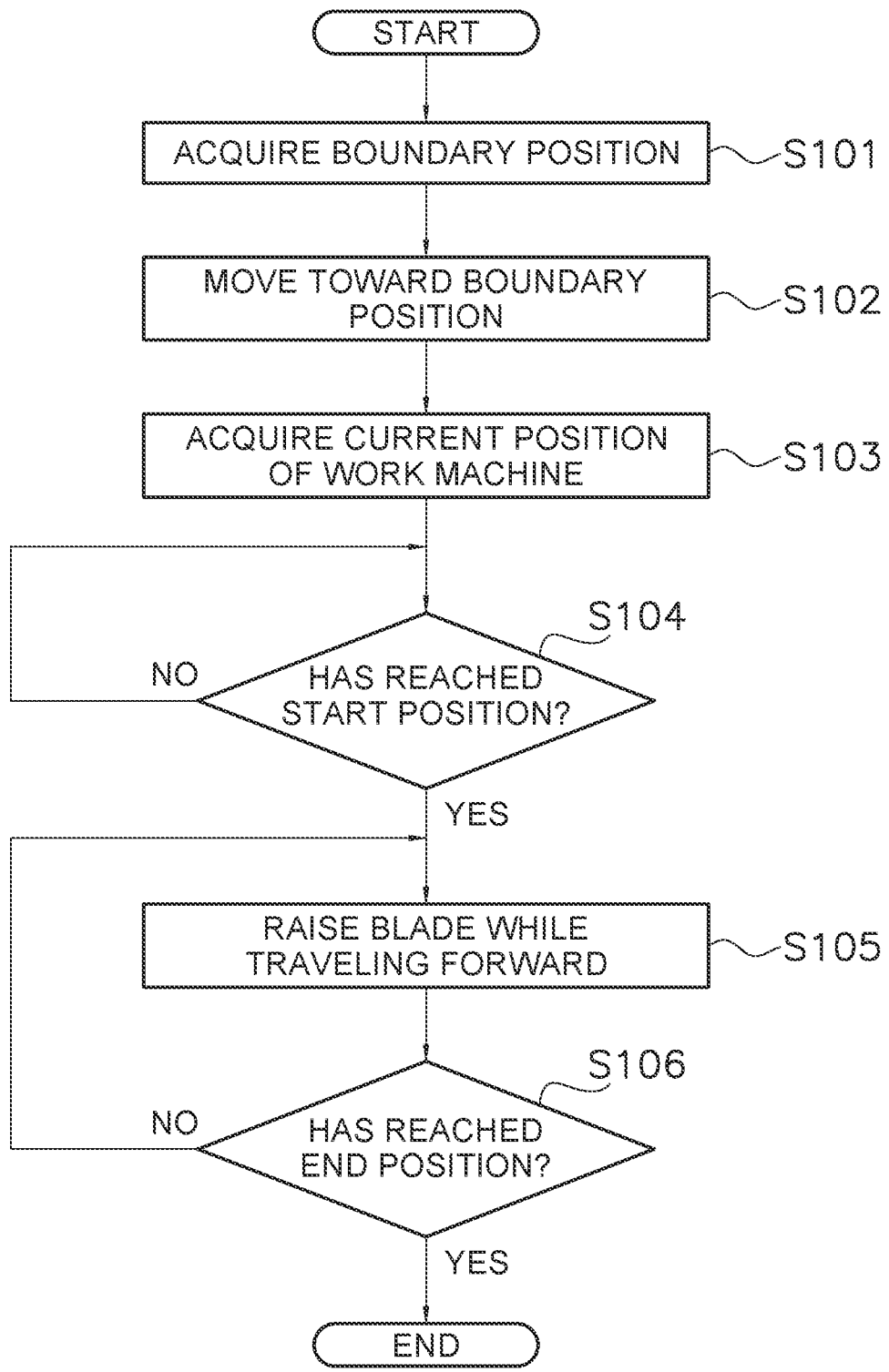
FIG. 8 is a flowchart illustrating processes of automatic control.

FIG. 8 is a flowchart illustrating processes executed by the machine controller 22 in order to form the berm 57. For example, the work machine 1 executes the processes illustrated in FIG. 8 upon receiving a command to form the berm 57 from the remote controller 43. Note that, it is assumed that the work machine 1 holds a soil 58 for forming the berm 57 on the blade 16 at the start of the processes illustrated in FIG. 8.

As illustrated in FIG. 8, in step S101, the machine controller 22 acquires the boundary position 53 between the work area 51 and the dumping area 52. The machine controller 22 acquires the boundary position 53 from the remote controller 43. Alternatively, the machine controller 22 may acquire the actual topography data from the remote controller 43 and acquire the boundary position 53 from the actual topography data.

Figure 9:
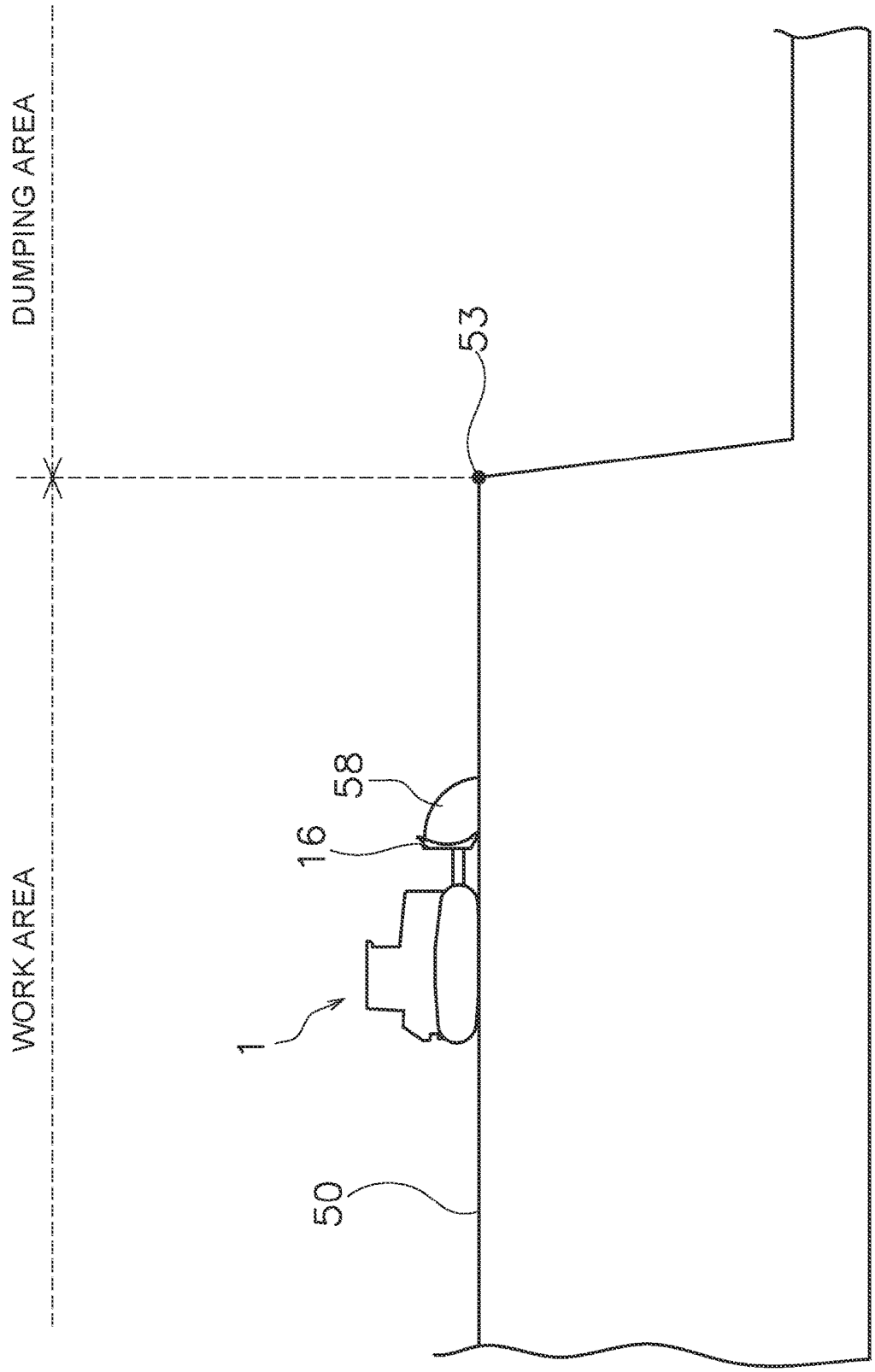
FIG. 9 is a vertical cross-sectional view illustrating the actual topography in the vicinity of the boundary position.

In step S102, the machine controller 22 controls the work machine 1 so that the work machine 1 moves toward the boundary position 53. That is, as illustrated in FIG. 9, the machine controller 22 causes the work machine 1 to travel from the work area 51 toward the dumping area 52. In step S103, the machine controller 22 acquires a current position of the work machine 1. The machine controller 22 acquires the current position of the work machine 1 from the position data of the work machine 1.

Figure 10:
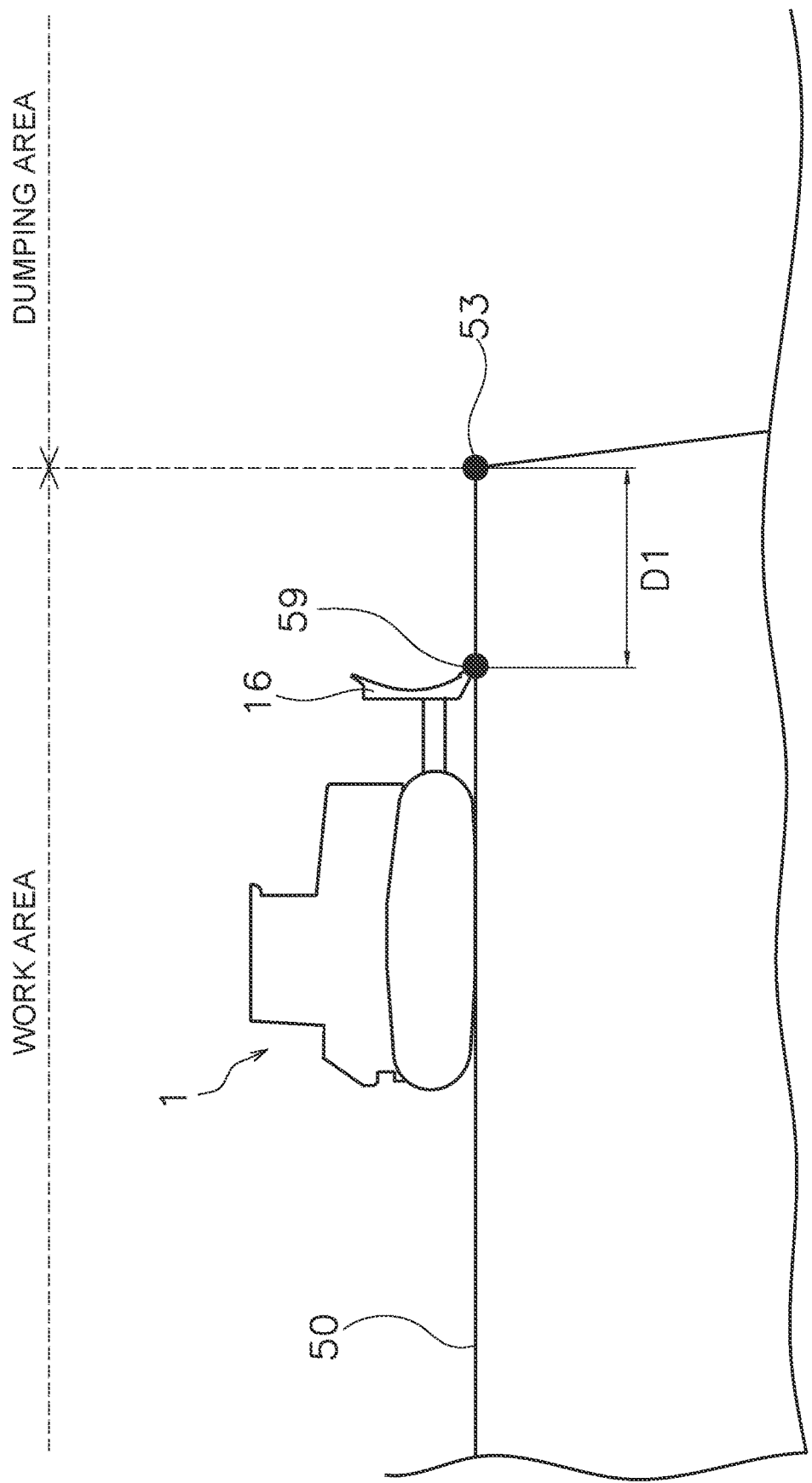
FIG. 10 is a vertical cross-sectional view illustrating the actual topography in the vicinity of the boundary position.

In step S104, the machine controller 22 determines whether the work machine 1 has reached a start position 59. As illustrated in FIG. 10, the start position 59 is a position that is away from the boundary position 53 toward the work area 51 by a predetermined distance D1. The predetermined distance D1 is stored in the machine controller 22. The predetermined distance D1 may be a fixed value. Alternatively, the machine controller 22 may acquire the predetermined distance D1 from the remote controller 43. The predetermined distance D1 may be set by an operator operating the input device 44. Note that, the soil 58 held by the blade 16 is omitted in FIG. 10 for ease of understanding.

Figure 11:
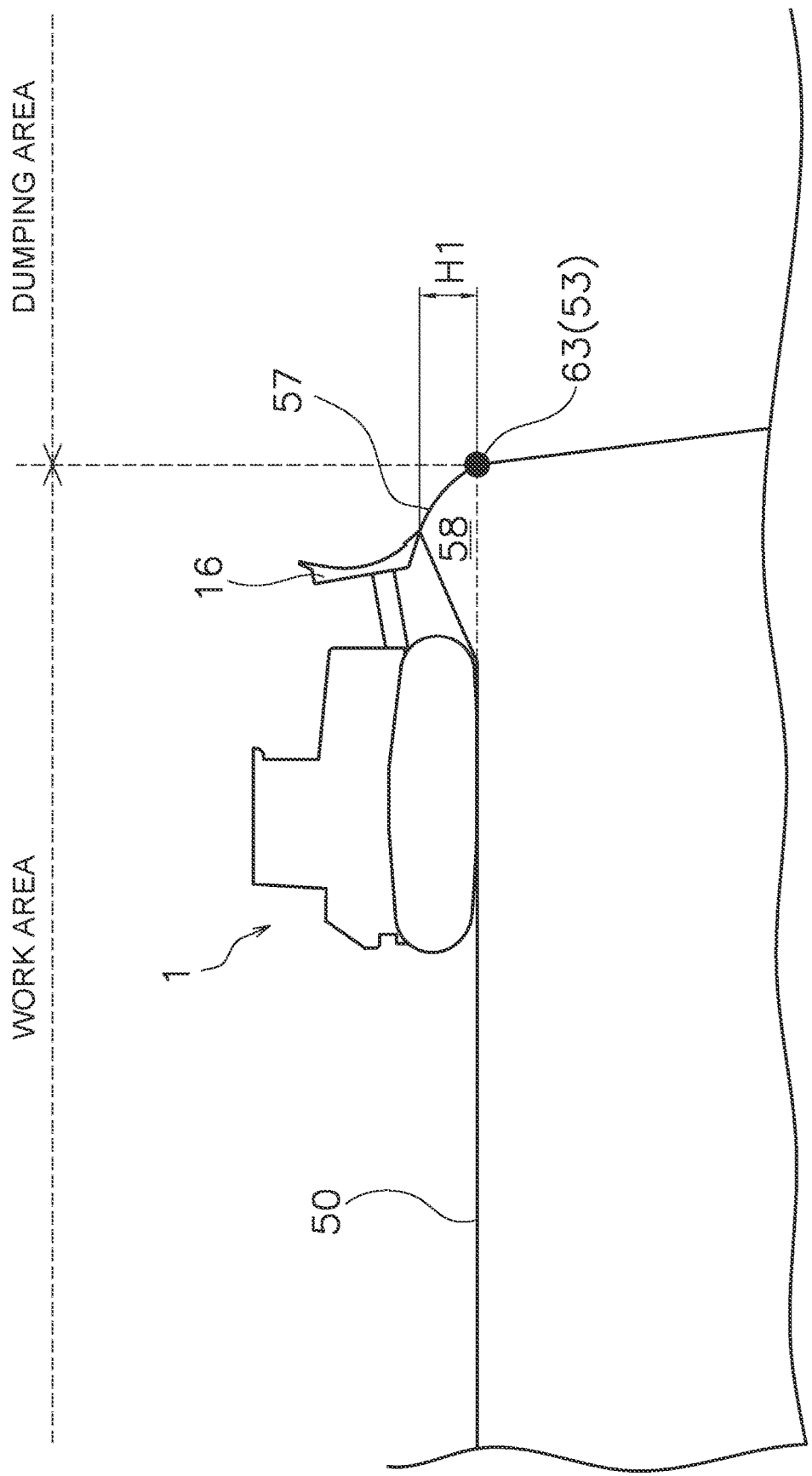
FIG. 11 is a vertical cross-sectional view illustrating the actual topography in the vicinity of the boundary position.

In step S105, the machine controller 22 raises the blade 16 from the start position 59 while traveling forward. The machine controller 22 raises the blade 16 from the start position 59 while causing the work machine 1 to travel forward. Accordingly, as illustrated in FIG. 11, the soil 58 is piled on the actual topography 50. The machine controller 22 raises the blade 16 to a predetermined height H1. As a result, the berm 57 is formed so that the height of the berm 57 is the predetermined height H1.

The predetermined height H1 is stored in the machine controller 22. The predetermined height H1 may be a fixed value. For example, the predetermined height H1 is half the height of the blade 16. Alternatively, the predetermined height H1 may be set by the operator operating the input device 44. The machine controller 22 holds the blade 16 at the predetermined height H1 after the blade 16 has reached the predetermined height H1.

In step S106, the machine controller 22 determines whether the work machine 1 has reached an end position 63. The end position 63 is positioned on the boundary position 53. Alternatively, the end position 63 may be positioned between the start position 59 and the boundary position 53. When the work machine 1 has reached the end position 63, the machine controller 22 ends the processes for forming the berm 57. As described above, in the system 100 according to the present embodiment, the berm 57 is formed in a vicinity of the boundary position 53 under the automatic control of the work machine 1.

Although one embodiment has been described above, the present disclosure is not limited to the above embodiment and various modifications may be made without departing from the gist of the invention. The work machine 1 is not limited to a bulldozer and may be another vehicle such as a wheel loader, a motor grader, or the like. The transport vehicle 2 is not limited to a dump truck and may be another type of vehicle. The drive source 18 of the work machine 1 or the drive source 34 of the transport vehicle 2 is not limited to an internal combustion engine and may be an electric motor. The transport vehicle 2 may be manually operated.

The remote controller 43, the machine controller 22, or the vehicle controller 40 may have a plurality of controllers separate from each other. The processes by the remote controller 43, the machine controller 22, or the vehicle controller 40 may be distributed and executed among the plurality of controllers. The processes described above may be distributed and executed among the plurality of processors.

Figure 12:
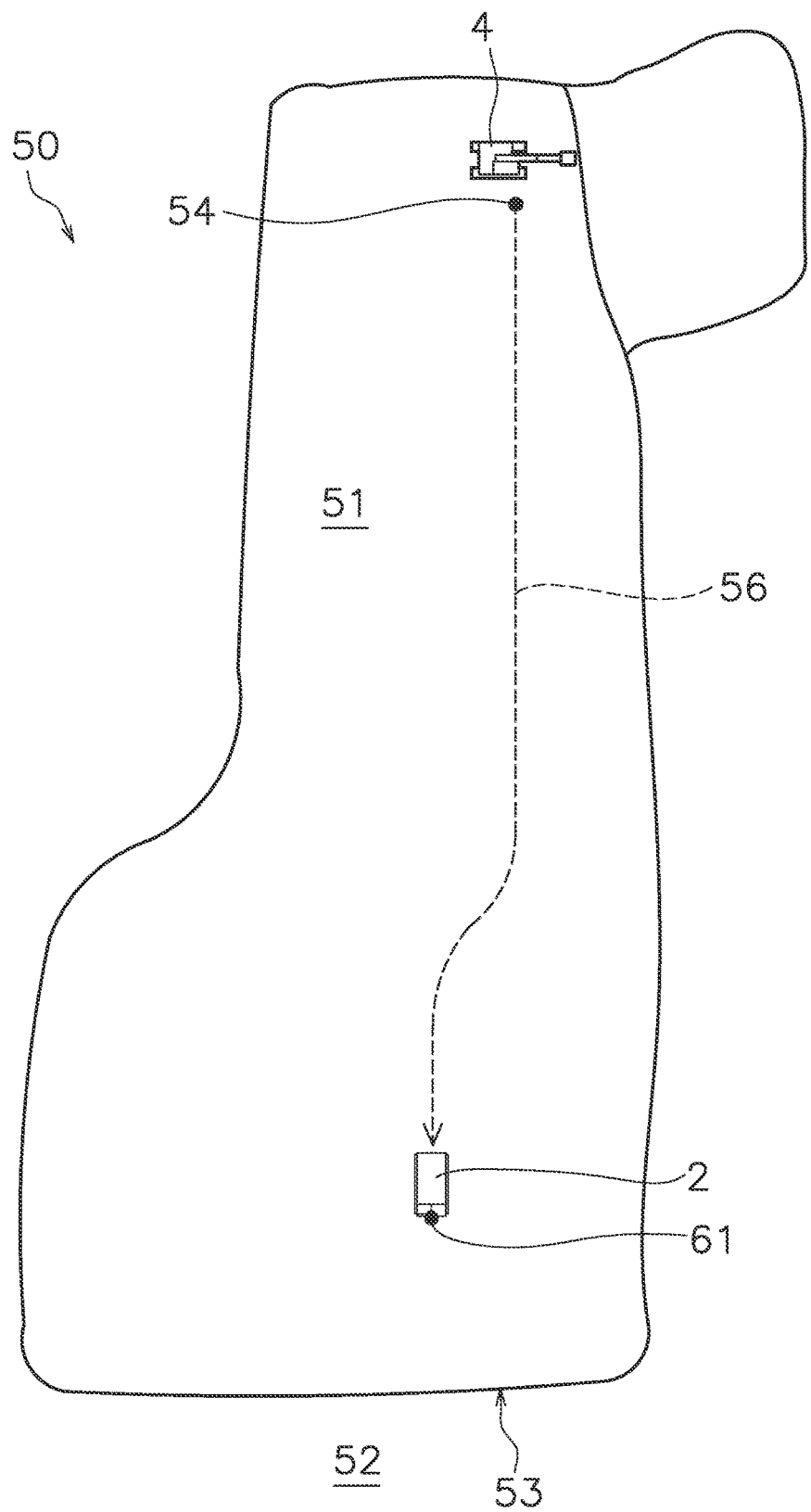
FIG. 12 is a view illustrating an example of a soil placement position and a route of the transport vehicle.

The remote controller 43 may control the transport vehicle 2 so that the transport vehicle 2 transports the soil 58 for forming the berm 57. For example, as illustrated in FIG. 12, the remote controller 43 determines the soil placement position 61. The soil placement position 61 is positioned on the work area 51. The soil placement position 61 is away from the boundary position 53 toward the work area 51. The soil placement position 61 may be set by an operator operating the input device 44. The remote controller 43 controls the transport vehicle 2 so that the transport vehicle 2 moves to the soil placement position 61. The remote controller 43 controls the transport vehicle 2 so that the transport vehicle 2 places the soil 58 for the berm 57 at the soil placement position 61.

Figure 13:
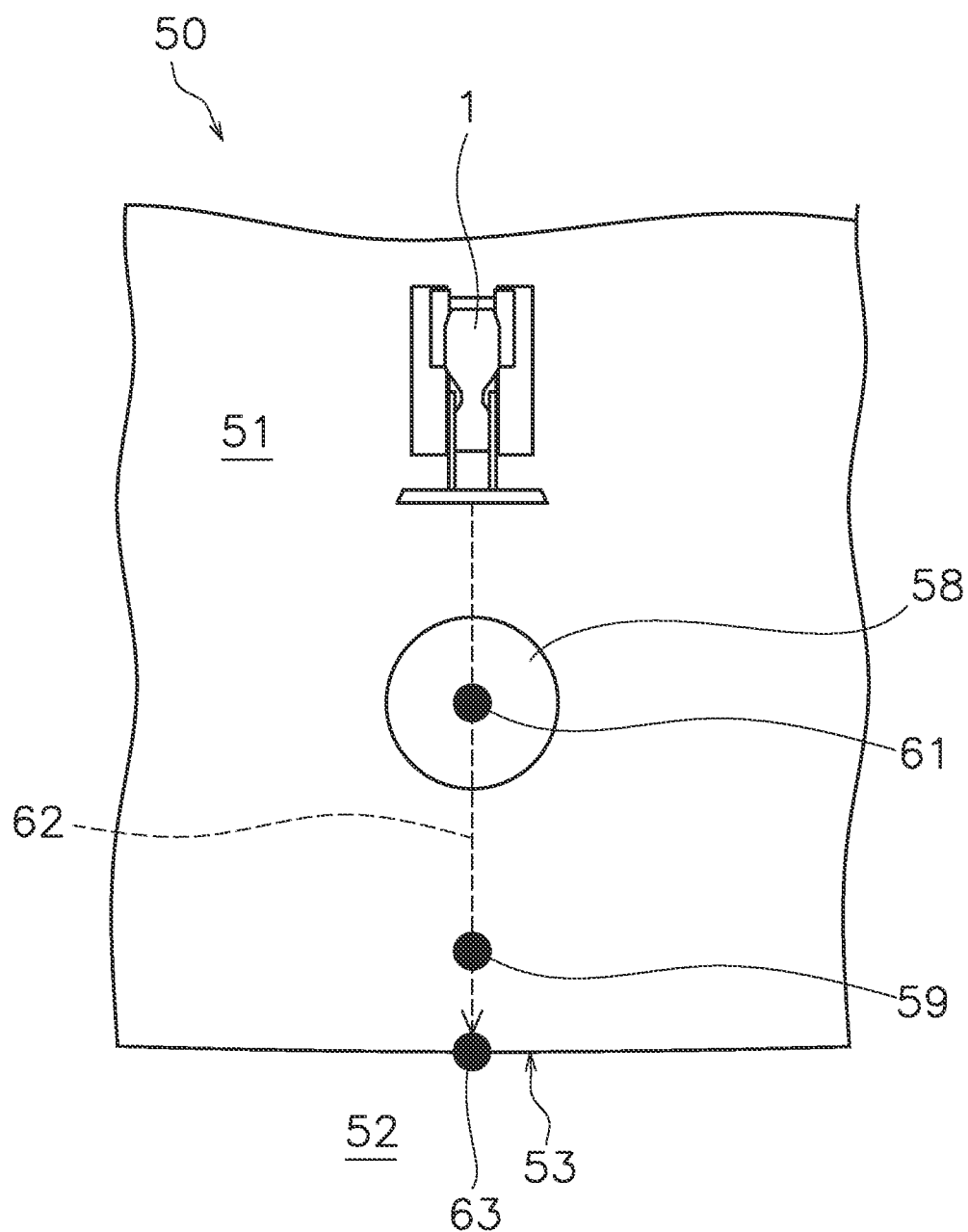
FIG. 13 is a view illustrating an example of a position of soil for a berm that acts as wheel stop and a route of the work machine.

The machine controller 22 may acquire a position of the soil 58 for the berm 57 placed by the transport vehicle 2. For example, the machine controller 22 acquires the soil placement position 61 from the remote controller 43 and acquires the soil placement position 61 as the position of the soil 58 for the berm 57. Alternatively, the machine controller 22 may communicate with the transport vehicle 2 and acquires a position 61 of the soil 58 for the berm 57 from the transport vehicle 2. The machine controller 22 sets a route 62 from the position 61 of the soil 58 toward the boundary position 53, as illustrated in FIG. 13. The machine controller 22 sets the route 62 so that the route 62 connects the position 61 of the soil 58 and the end position 63. For example, the machine controller 22 may set the route 62 so that the travel distance of the work machine 1 is minimized. The machine controller 22 controls the work machine 1 so that the work machine 1 moves along the route 62.

The processes of the automatic control of the work machine 1 or the transport vehicle 2 are not limited to those of the above-mentioned embodiment and may be changed, omitted, or added. The execution order of the processes of the automatic control is not limited to that of the above-mentioned embodiment and may be changed. A portion of the processes by the machine controller 22 may be executed by the remote controller 43. For example, a portion or all of the processes for forming the berm 57 may be executed by the remote controller 43.

According to the present disclosure, it is possible to form a berm that acts as wheel stop under the automatic control of the work machine.

The invention claimed is:

1. A method for controlling a work machine including a work implement and a travel device, the method comprising:
  acquiring a boundary position between a work area and a dumping area;
  acquiring a current position of the work machine; and
  based on the current position of the work machine, automatically controlling the work machine so as to form a berm that acts as a wheel stop by raising the work implement upon determining that the work machine has reached a position, the position being away from the boundary position toward the work area by a predetermined distance, when the work machine is traveling from the work area toward the dumping area wherein
  the position is determined as a start position for forming the berm, automatically forming the berm upon determining that the work machine has reached the start position, and automatically stopping forming of the berm when the work machine is located between the start position and the boundary position or at the boundary position.

2. The method according to claim 1, further comprising controlling the work implement so that a height of the berm is a predetermined height.

3. The method according to claim 2, further comprising acquiring an operation signal indicative of an operation by an operator; and setting the predetermined height according to the operation signal.

4. The method according to claim 1, further comprising acquiring a position of a soil for the berm on the work area;

setting a route from the position of the soil toward the boundary position; and controlling the work machine so that the work machine moves along the route.

5. The method according to claim 1, further comprising acquiring a soil placement position;

controlling a transport vehicle so that the transport vehicle moves to the soil placement position; and controlling the transport vehicle so that the transport vehicle places a soil for the berm at the soil placement position.

6. A system for controlling a work machine including a work implement and a travel device, the system comprising:

a sensor configured to detect a current position of the work machine; and a controller configured to acquire a boundary position between a work area and a dumping area, acquire a current position of the work machine, and based on the current position of the work machine, automatically control the work machine so as to form a berm that acts as a wheel stop by raising the work implement, upon determining that the work machine has reached a position, the position being away from the boundary position toward the work area by a predetermined distance, when the work machine is traveling from the work area toward the dumping area wherein the position is determined as a start position for forming the berm, automatically forming the berm upon determining that the work machine has reached the start position, and automatically stopping forming of the berm when the work machine is located between the start position and the boundary position or at the boundary position.

7. The system according to claim 6, wherein
the controller is further configured to control the work implement so that a height of the berm is a predetermined height.

8. The system according to claim 7, further comprising an input device configured to output an operation signal indicative of an operation by an operator,
the controller being further configured to
acquire the operation signal, and
set the predetermined height according to the operation signal.

9. The system according to claim 6, wherein
the controller is further configured to
acquire a position of a soil for the berm on the work area, and
based on the current position of the work machine, control the work machine so that the work machine moves from the position of the soil to the boundary position.

10. The system according to claim 6, wherein
the controller is further configured to
acquire a soil placement position,
control a transport vehicle so that the transport vehicle moves to the soil placement position, and
control the transport vehicle so that the transport vehicle places a soil for the berm at the soil placement position.

11. A work machine comprising:
a work implement;
a travel device,
a sensor configured to detect a current position of the work machine; and
a controller configured to
acquire a current position of the work machine, and
based on the current position of the work machine, automatically control the work machine so as to form a berm that acts as a wheel stop by raising the work implement, upon determining that the work machine has reached a position, the position being away from a boundary position between a work area and a dumping area toward the work area by a predetermined distance, when the work machine is traveling from the work area toward the dumping area wherein
the position is determined as a start position for forming the berm,
automatically forming the berm upon determining that the work machine has reached the start position, and
automatically stopping forming of the berm when the work machine is located between the start position and the boundary position or at the boundary position.

12. The work machine according to claim 11, wherein the controller is further configured to control the work implement so that a height of the berm is a predetermined height.

13. The work machine according to claim 12, further comprising
an input device configured to output an operation signal indicative of an operation by an operator,
the controller being further configured to
acquire the operation signal, and
set the predetermined height according to the operation signal.

14. The work machine according to claim 11, wherein
the controller is further configured to
acquire a position of a soil for the berm on the work area,
set a route from the position of the soil toward the boundary position, and
control the work machine so that the work machine moves along the route.

15. The work machine according to claim 11, wherein
the controller is further configured to
acquire a soil placement position,
control a transport vehicle so that the transport vehicle moves to the soil placement position, and
control the transport vehicle so that the transport vehicle places a soil for the berm at the soil placement position.

16. The method according to claim 2, wherein
the predetermined height is based on a height of a blade of the work implement.

17. The work machine according to claim 11, wherein
a communication device is configured to receive a signal to form the berm,
upon the communication device receiving the signal, the controller being configured to determine whether the work machine has reached the position and to automatically control the work machine to form the berm upon determining that the work machine has reached the position.

* * * * *